(12) United States Patent
Crispell

(10) Patent No.: US 8,596,100 B1
(45) Date of Patent: Dec. 3, 2013

(54) LOADING DOCK SAFETY LOCK

(76) Inventor: Rick A. Crispell, Clackamas, OR (US)

(*) Notice: Subject to any disclaimer, the term of this patent is extended or adjusted under 35 U.S.C. 154(b) by 18 days.

(21) Appl. No.: 13/524,013

(22) Filed: Jun. 15, 2012

(51) Int. Cl.
*B65D 55/14* (2006.01)

(52) U.S. Cl.
USPC ... 70/63; 70/56; 70/211; 70/416; 70/DIG. 43; 70/DIG. 56; 292/DIG. 32

(58) Field of Classification Search
USPC ............. 70/63, 52–56, 211, 212, DIG. 43, 70/DIG. 56, 416, 417; 292/DIG. 32
See application file for complete search history.

(56) References Cited

U.S. PATENT DOCUMENTS

| | | | | |
|---|---|---|---|---|
| 256,902 A | * | 4/1882 | Kirk | 70/56 |
| 547,550 A | * | 10/1895 | Hopkins | 70/56 |
| 1,136,582 A | * | 4/1915 | Birdsong | 70/56 |
| 2,716,882 A | * | 9/1955 | Vold et al. | 70/159 |
| 3,392,555 A | * | 7/1968 | Beaver | 70/56 |
| 3,563,069 A | * | 2/1971 | Ferrer | 70/129 |
| 3,888,096 A | * | 6/1975 | Huss | 70/209 |
| 3,971,240 A | * | 7/1976 | Love, Sr. | 70/160 |
| 4,033,156 A | * | 7/1977 | Cottingham | 70/56 |
| 4,044,579 A | * | 8/1977 | Le Bel | 70/416 |
| 4,248,069 A | * | 2/1981 | Burbank | 70/160 |
| 4,286,814 A | * | 9/1981 | Harrington et al. | 292/281 |
| 4,350,032 A | * | 9/1982 | Kochackis | 70/427 |
| 5,168,258 A | * | 12/1992 | Radke | 340/542 |
| D333,083 S | * | 2/1993 | Stenger | D8/346 |
| 5,203,663 A | | 4/1993 | Ruppe | |
| D336,418 S | | 6/1993 | Carter | |
| 5,275,028 A | * | 1/1994 | Giarrante | 70/56 |
| D369,090 S | * | 4/1996 | Santos et al. | D8/346 |
| 5,528,998 A | * | 6/1996 | Smith | 109/50 |
| 5,878,613 A | | 3/1999 | Tabacchi | |
| 6,058,745 A | * | 5/2000 | Sanchez | 70/56 |
| 6,113,337 A | | 9/2000 | Massey | |
| 6,578,393 B2 | * | 6/2003 | Yarborought | 70/56 |
| 6,676,360 B2 | | 1/2004 | Springer | |
| 6,983,629 B1 | * | 1/2006 | Gogel | 70/14 |
| 8,297,089 B2 | * | 10/2012 | Walker | 70/160 |
| 2001/0009640 A1 | | 7/2001 | Springer | |
| 2005/0144991 A1 | * | 7/2005 | Bravo et al. | 70/56 |
| 2010/0275530 A1 | | 11/2010 | Laskowski | |

* cited by examiner

*Primary Examiner* — Suzanne Barrett
(74) *Attorney, Agent, or Firm* — Jason L. Gilbert

(57) ABSTRACT

A loading door safety lock for locking a loading dock in a closed position and for retaining the keys of a vehicle to prevent inadvertent drive-offs. The loading door safety lock generally includes a base member which is mounted to a loading dock door directly beneath its door latch housing. A cover member is hingedly secured to the base member. When the cover member is engaged with the base member in a closed position, the latch of the door latch housing may be locked in place to prevent the loading dock door from being opened. Further, the keys of a driver may be placed in a key storage compartment within the base member to prevent the driver from driving off while the truck is being loaded or unloaded through the loading dock door.

2 Claims, 7 Drawing Sheets

LOADING DOCK SAFETY LOCK

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a door safety lock and more specifically it relates to a loading door safety lock for locking a loading dock in a closed position and for retaining the keys of a vehicle to prevent inadvertent drive-offs.

2. Description of the Related Art

Any discussion of the related art throughout the specification should in no way be considered as an admission that such related art is widely known or forms part of common general knowledge in the field.

Loading dock doors are commonly used in warehouses or other facilities to facilitate the loading and unloading of various items to and/or from a delivery truck. Such loading dock doors generally include a latching mechanism which locks the loading dock door closed. While these mechanisms do latch the door shut, they do not prevent damage or injury due to human error; such as the delivery truck driver inadvertently departing early while loading dock personnel is in the process of loading or unloading.

Currently there are expensive truck restraining devices on the market which are not economically feasible for many individuals and companies. Further, such devices are often not universally operable with all trucks. Additionally, such devices commonly suffer from risks related to human error on the part of the truck driver. Finally, such devices are often complicated to operate and maintain.

Because of the inherent problems with the related art, there is a need for a new and improved loading door safety lock for locking a loading dock in a closed position and for retaining the keys of a vehicle to prevent inadvertent drive-offs.

BRIEF SUMMARY OF THE INVENTION

The invention generally relates to a loading dock safety lock which includes a base member which is mounted to a loading dock door directly beneath its door latch housing. A cover member is hingedly secured to the base member. When the cover member is engaged with the base member in a closed position, the latch of the door latch housing may be locked in place to prevent the loading dock door from being opened. Further, the keys of a driver may be placed in a key storage compartment within the base member to prevent the driver from driving off while the truck is being loaded or unloaded through the loading dock door.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
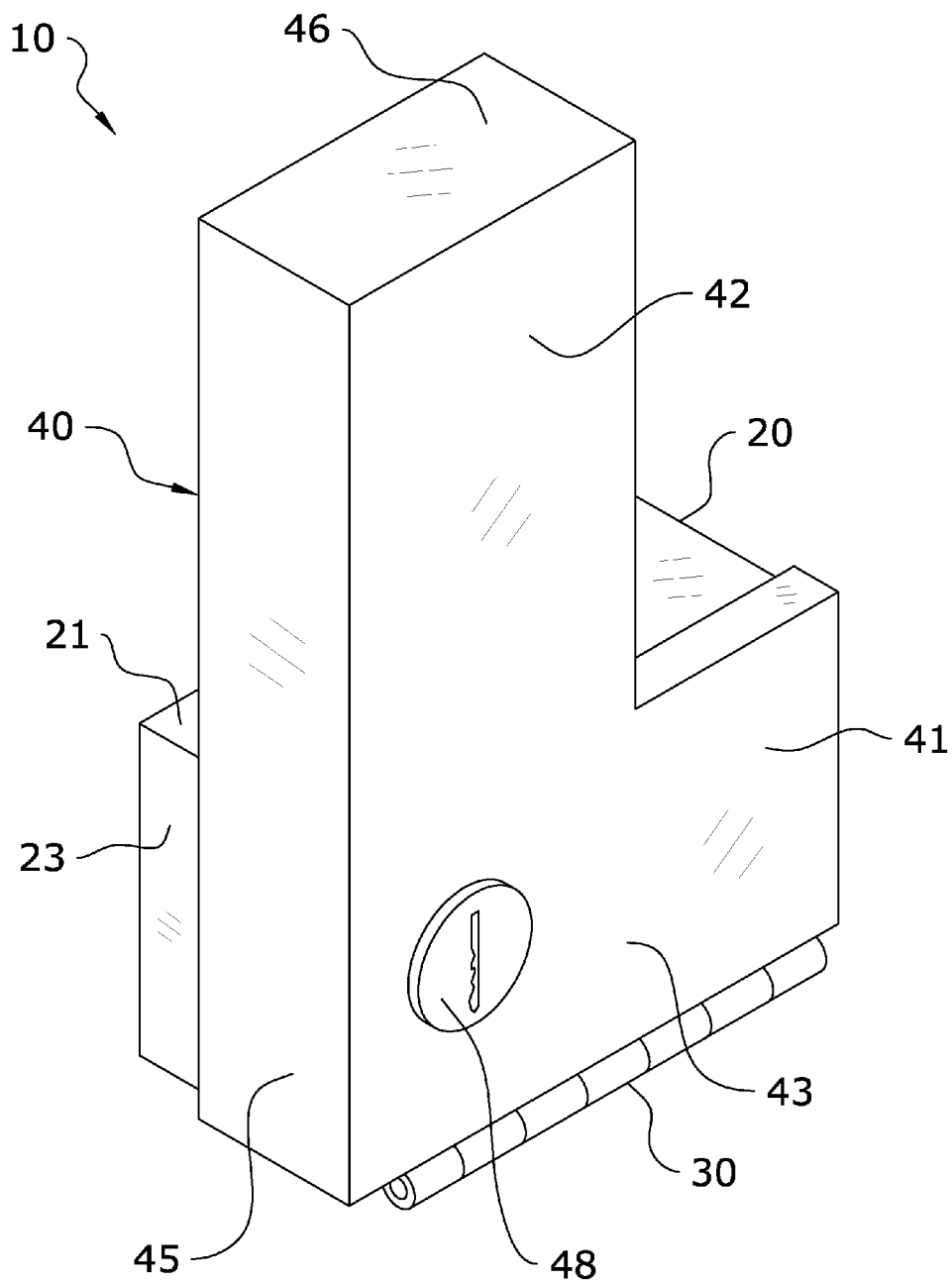
FIG. 1 is an upper perspective view of the present invention in a closed position.

A. Overview.

Turning now descriptively to the drawings, in which similar reference characters denote similar elements throughout the several views, FIGS. 1 through 7 illustrate a loading door safety lock 10, which comprises a base member 20 which is mounted to a loading dock door 12 directly beneath its door latch housing 14. A cover member 40 is hingedly secured to the base member 20. When the cover member 40 is engaged with the base member 20 in a closed position, the latch 15 of the door latch housing 14 may be locked in place to prevent the loading dock door 12 from being opened. Further, the keys 18 of a driver may be placed in a key storage compartment 27 within the base member 20 to prevent the driver from driving off while the truck is being loaded or unloaded through the loading dock door 12.

While the present application discusses use of the present invention in combination with loading dock doors 12, it should be appreciated that the present invention is adapted for use with any type of door (such as a garage door) which utilizes a rail guard 13 and conventional door latch housing 14. Thus, the present invention should not be construed as being limited for use with a specific type of loading dock door 12 such as those used for loading and unloading delivery vehicles.

B. Base Member.

Figure 2:
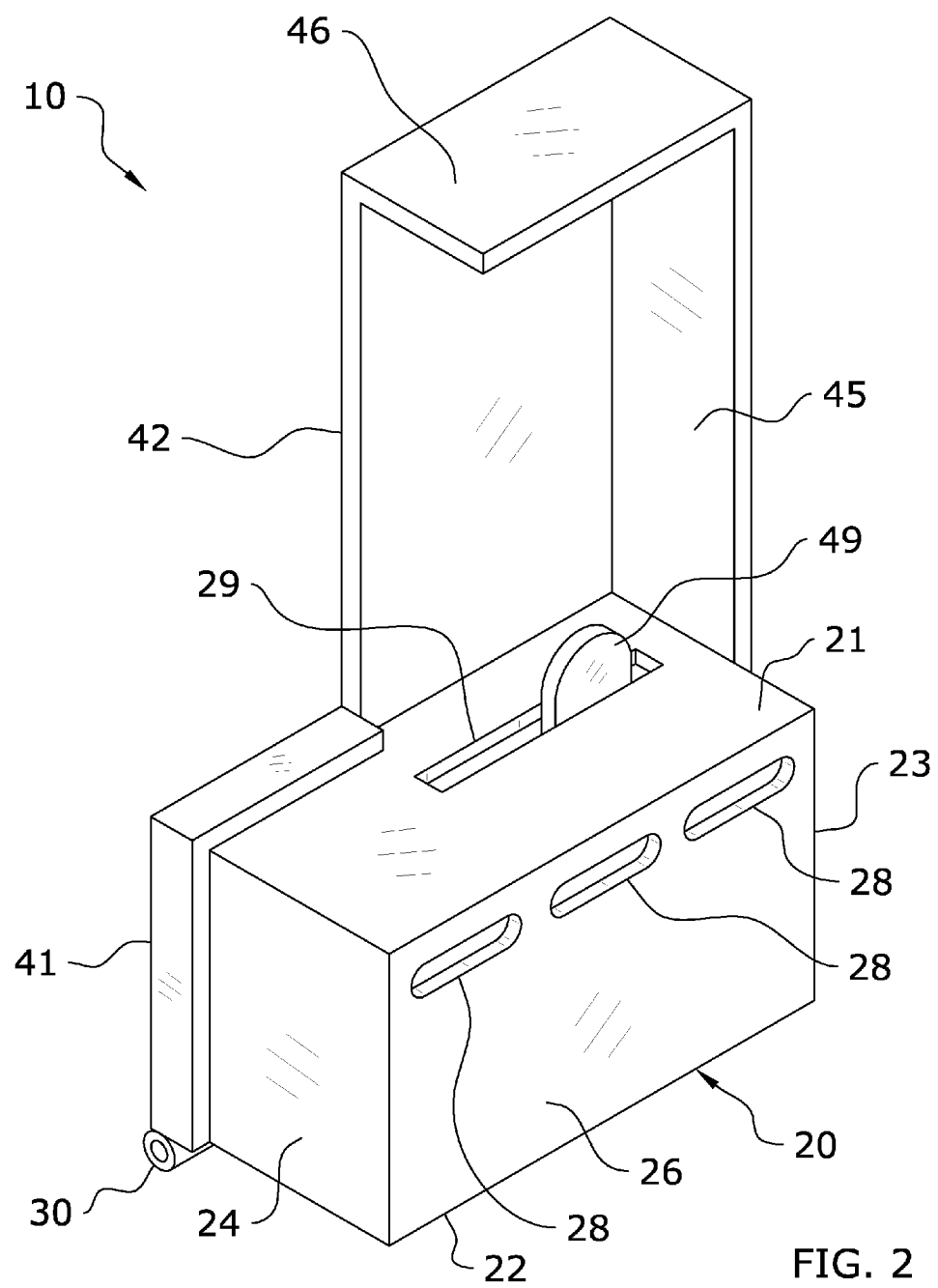
FIG. 2 is a rear perspective view of the present invention in a closed position.

As shown in FIG. 2, the present invention includes a base member 20 which is mounted to a loading dock door 12 to secure the present invention thereto. The base member 20 is generally comprised of a rectangular- or box-shaped structure having an upper end 21, a lower end 22, a first side wall 23, a second side wall 24, a front opening 25 and a rear end 26.

While the base member 20 is illustrated as being comprised of a box-like structure, it is appreciated that other configurations may be utilized. Accordingly, the present application should not be construed as limiting the structure of the base member 20 to that of the exemplary figures. Similarly, the material of the base member 20 may vary.

The front opening 25 leads to a key storage compartment 27 which is defined by the upper end 21, lower end 22, first side wall 23, second side wall 24 and rear end 26 of the base member. The key storage compartment 27 is adapted to be fully enclosed when the cover member 40 is secured over the front opening 25 of the base member 20 as shown in FIG. 1. The keys 18 of the delivery truck driver are locked within the key storage compartment 27 when the present invention is in use to prevent inadvertent drive-offs.

The rear end 26 of the base member 20 preferably includes one or more mounting slots 28 or apertures. The mounting slots 28 may be utilized to mount the base member 20 to the loading dock door 12. While the figures illustrate the use of three mounting slots 28, it is appreciated that more or less mounting slots 28 may be utilized depending on the embodiment of the present invention. The mounting slots 28 will preferably be positioned adjacent the upper end 21 of the base member 20 as shown in FIG. 2, though other configurations may be utilized.

The upper end 21 of the base member 20 includes a latch retaining slot 29 as shown in FIG. 2. The latch 49 of the cover member 40 will engage with the latch retaining slot 29 when the cover member 40 is locked into a closed position over the base member 20 as shown in FIGS. 1 and 2.

C. Hinge.

Figure 3:
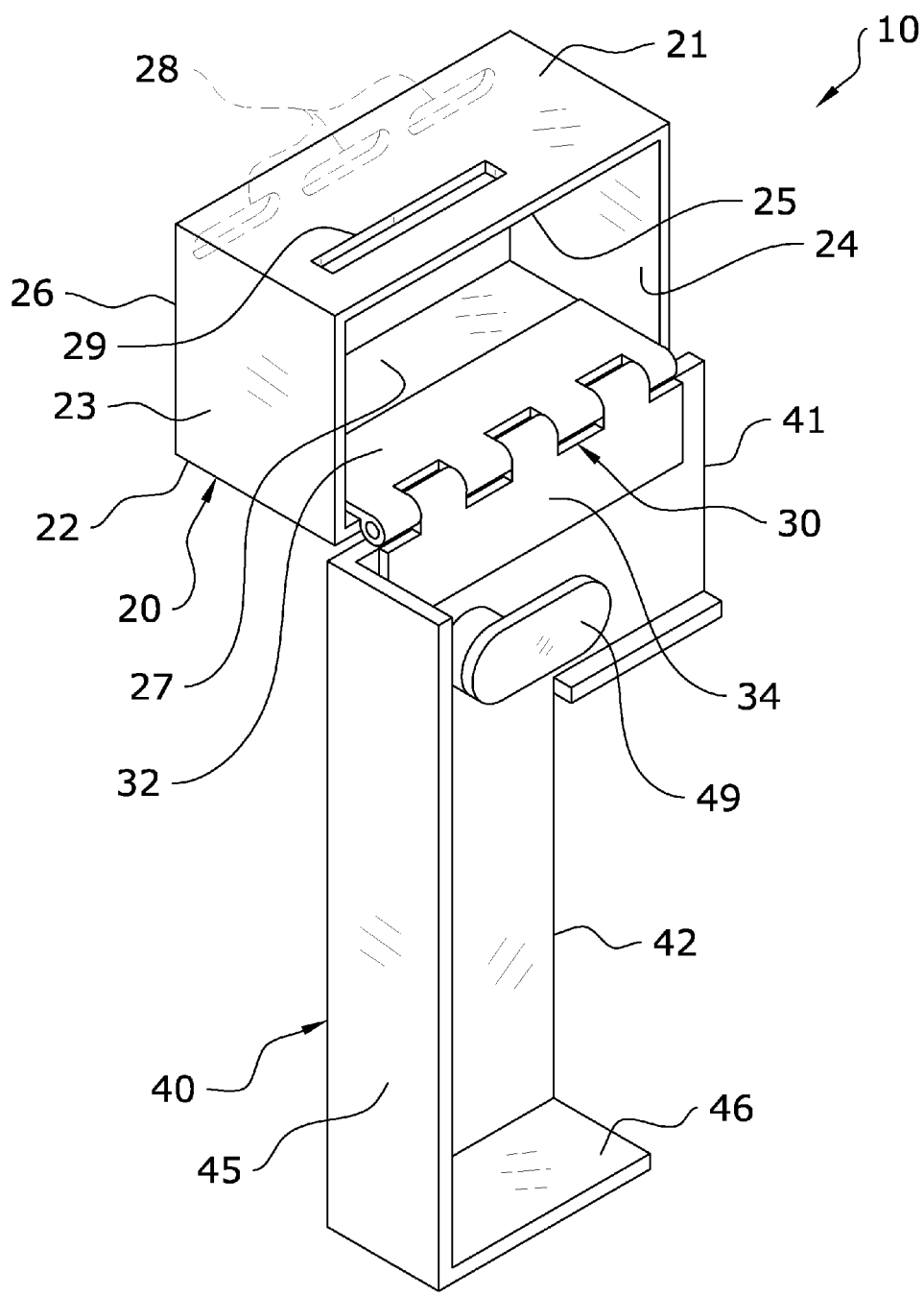
FIG. 3 is a rear perspective view of the present invention in an open position.

The present invention includes a hinge 30 which hingedly connects the base member 20 to the cover member 40 as shown in FIG. 3. The first portion 32 of the hinge 30 is preferably fixedly secured to the inner surface of the lower end 22 of the base member 20. The second portion 34 of the hinge 30 is preferably fixedly secured to the inner surface of the base portion 41 of the cover member 40. However, it is appreciated that various other types of hinges 30 or devices as well as various placements may be utilized so long as the cover member 40 is hingedly secured to the base member 20.

D. Cover Member.

As shown in FIGS. 1 and 2, the present invention includes a cover member 40 which is hingedly attached to the base member 20. When locked in an upright position, the cover member 40 will act to both secure the loading dock door 12 in a closed, locked position by locking the door latch 15 and prevent inadvertent drive-offs by securing the keys 18 of a driver within the key storage compartment 27 of the base member 20.

The cover member 40 may be comprised of various configurations, but will preferably be comprised of an L-shaped configuration comprised of a rectangular base portion 41 and an upper extension 42 extending therefrom as shown in FIGS. 1 and 3. The base portion 41 of the cover member 40 closes off the key storage compartment 27 and is connected to the hinge 30. The upper extension portion 42 of the cover member 40 acts to secure the door latch 15 of the door latch housing 14 in a locked position as shown in FIG. 5.

The front end 43 of the base portion 41 will generally include a key lock 48 which is utilized to engage and disengage a key lock 48 which acts to lock the cover member 40 in a closed position or release the cover member 40 into an open position by turning a latch 49. When engaged, the latch 49 will extend through the latch retaining slot 29 of the base member 20 to secure the cover member 40 in a closed position. When disengaged, the latch 49 will allow the cover member 40 to freely open or close with respect to the base member 20.

Figure 5:
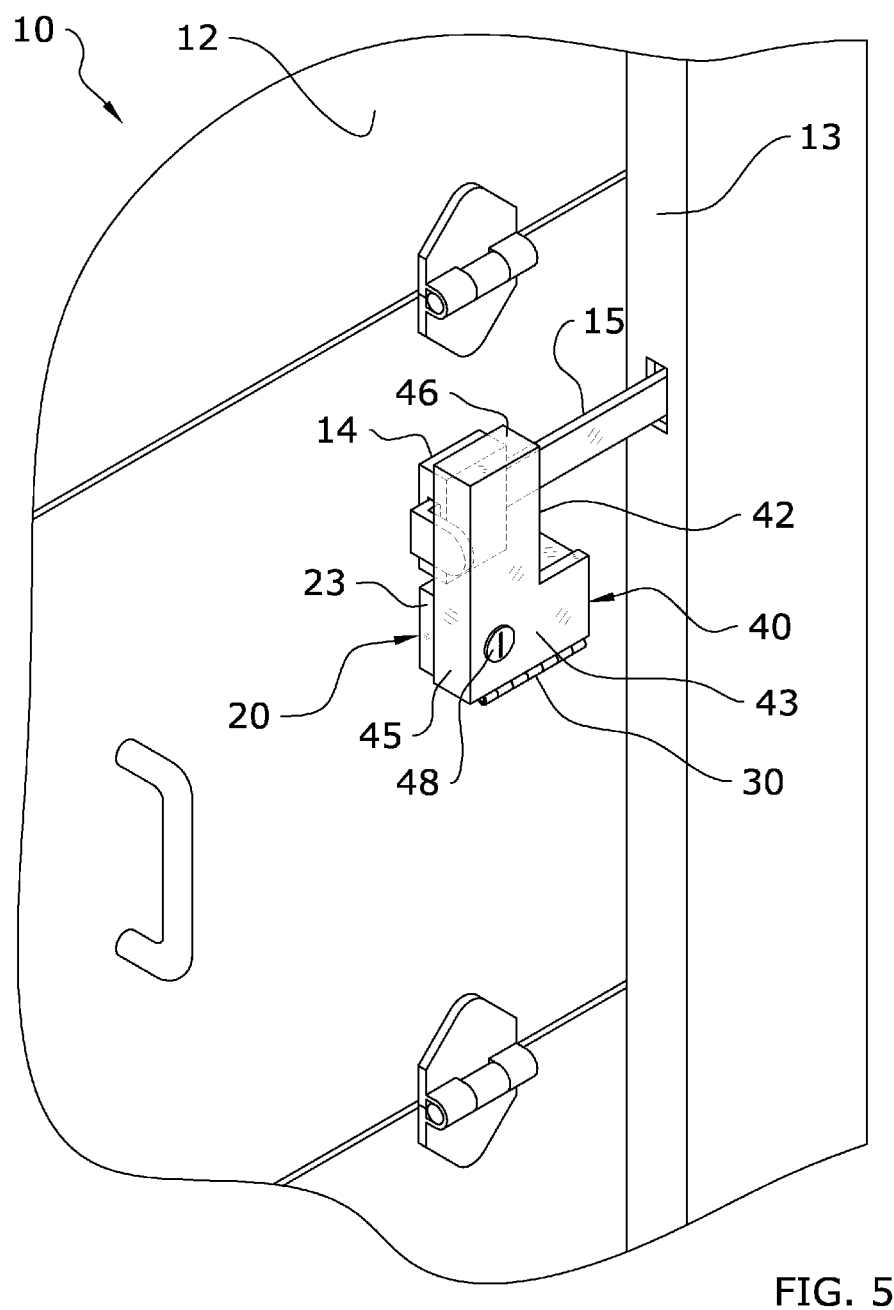
FIG. 5 is an upper perspective view of the present invention installed on a loading dock door in a closed position.
Figure 6:
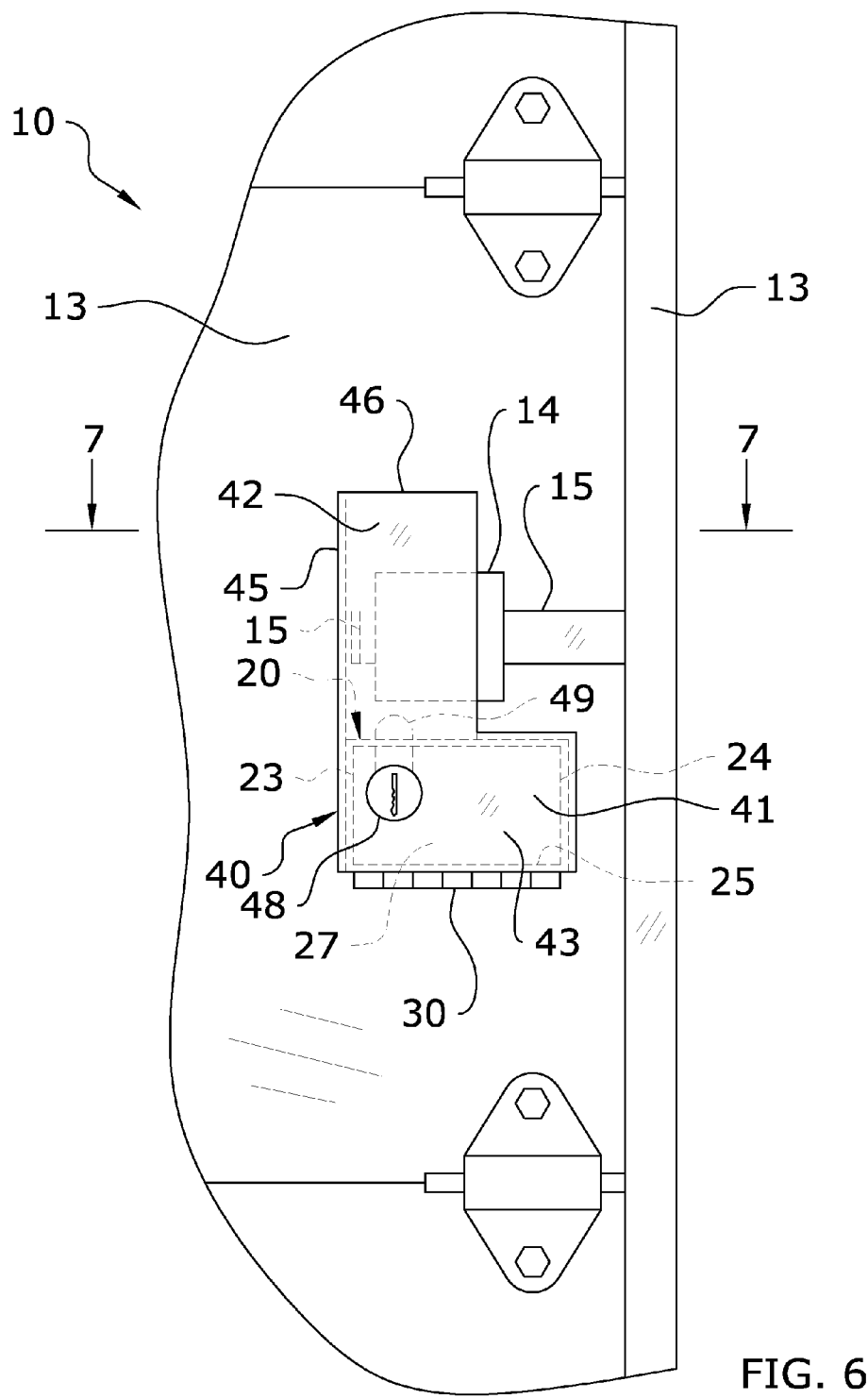
FIG. 6 is a front interior view of the present invention in use in a closed position.
Figure 7:
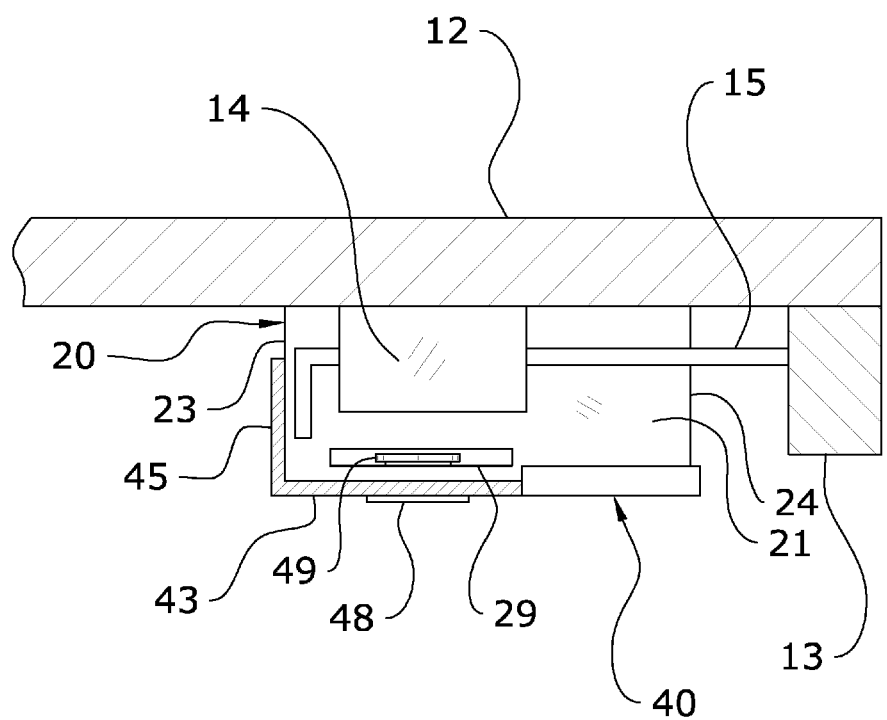
FIG. 7 is a top sectional view of the present invention in use.

The upper extension 42 includes a side wall 45 which will encapsulate and lock in place the door latch 15 of the door latch housing 14 when the present invention is in use as shown in FIG. 5. The upper extension 42 also includes an upper wall 46 which will cover the upper end 21 of the base member 20 to prevent the latch 49 from being inadvertently or manually released without use of the key lock 48.

E. Operation of Preferred Embodiment.

Figure 4:
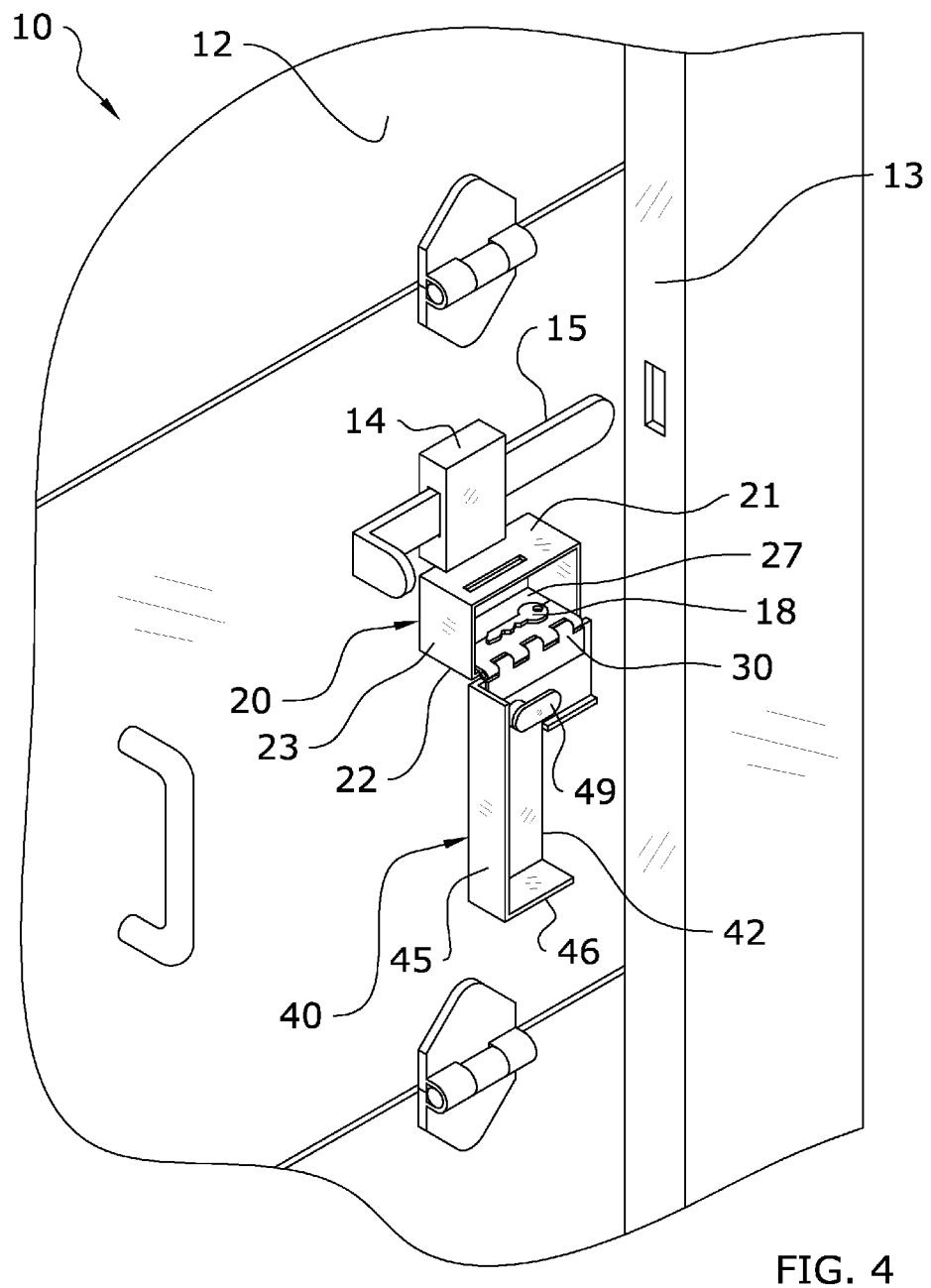
FIG. 4 is an upper perspective view of the present invention installed on a loading dock door in an open position.

In use, the base member 20 is first secured to the loading dock door 12 via use of the mounting slots 28 as shown in FIG. 4. The base member 20 will preferably be positioned just beneath the door latch housing 14. With the door latch 15 engaged with the rail guard 13, the cover member 40 of the present invention may be hinged upward to enclose the base member 20 and secure the door latch 15 in place by preventing it from sliding outward due to the side wall 45 of the cover member 40 as shown in FIG. 5. The cover member 40 may be locked in place by engaging the latch 49 through the latch retaining slot 29 of the base member 20 with the key lock 48.

When necessary, the cover member 40 may be released from the base member 20 to allow the door latch 15 to slide open, thus allowing the loading dock door 12 to be opened. The keys 18 of a delivery truck driver may be placed within the key storage compartment 27 and the cover member 40 closed to ensure that the truck driver does not inadvertently drive away while the truck is still being loaded/unloaded.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A loading dock safety locking system, comprising:
   a loading dock door, wherein said loading dock door includes a door latch housing and a door latch;
   a rectangular base member mounted to said loading dock door beneath said door latch housing, wherein said base member includes an upper end, a lower end, a first side wall, a second side wall, a front opening and a rear end, wherein said base member includes a key storage compartment defined by said upper end, said lower end, said first side wall, said second side wall and said rear end; and
   an L-shaped cover member hingedly secured to said base member, wherein said cover member is adapted to enclose said door latch housing and said door latch, wherein said cover member is comprised of a base portion and an upper extension extending therefrom.

2. The loading dock safety lock of claim 1, wherein said loading dock door is comprised of a garage door.

* * * * *